(12) United States Patent
Sims et al.

(10) Patent No.: US 6,492,801 B1
(45) Date of Patent: Dec. 10, 2002

(54) METHOD, APPARATUS, AND SYSTEM FOR REAL TIME REACTIVE POWER OUTPUT MONITORING AND PREDICTING

(75) Inventors: Thomas R. Sims, Birmingham, AL (US); Daniel W. Noles, Birmingham, AL (US); Daryl K. Hallmark, Alabaster, AL (US)

(73) Assignee: Southern Company Services, Inc., Birmingham, AL (US)

( * ) Notice: Subject to any disclaimer, the term of this patent is extended or adjusted under 35 U.S.C. 154(b) by 0 days.

(21) Appl. No.: 09/934,365

(22) Filed: Aug. 21, 2001

(51) Int. Cl.[7] .............................................. G01R 11/32
(52) U.S. Cl. ...................................................... 324/142
(58) Field of Search .............................. 324/76.13, 142; 307/19, 52, 87; 318/808, 809; 322/6, 20, 25; 323/205

(56) References Cited

U.S. PATENT DOCUMENTS

| | | | |
|---|---|---|---|
| 3,839,629 A | * 10/1974 | Russell | ................... 235/151.21 |
| 4,380,146 A | 4/1983 | Yannone et al. | |
| 5,225,712 A | 7/1993 | Erdman | |
| 5,294,879 A | 3/1994 | Freeman et al. | |
| 5,321,308 A | 6/1994 | Johncock | |
| 5,367,246 A | 11/1994 | Kaiser | |
| 5,369,353 A | 11/1994 | Erdman | |
| 5,422,561 A | 6/1995 | Williams et al. | |
| 5,581,470 A | 12/1996 | Pawloski | |
| 5,594,659 A | 1/1997 | Schlueter | |
| 5,610,834 A | 3/1997 | Schlueter | |
| 5,621,305 A | 4/1997 | Clark et al. | |
| 5,642,000 A | 6/1997 | Jean-Jumeau et al. | |
| 5,646,512 A | 7/1997 | Beckwith | |
| 5,796,628 A | 8/1998 | Chiang et al. | |
| 5,798,634 A | 8/1998 | Terada et al. | |
| 5,900,723 A | 5/1999 | Rostron | |
| 5,929,538 A | 7/1999 | O'Sullivan et al. | |
| 6,301,897 B1 | * 10/2001 | Uchida | ........................ 60/728 |

OTHER PUBLICATIONS

"Grid Reliability Workshop", Plenary Session Grid Operator/Plant Interface Discussion, pp. 1–17 and Panel Session: Industry Grid Experience, pp. 1–12, Apr. 2–4, 2001.

* cited by examiner

Primary Examiner—Christine Oda
Assistant Examiner—Etienne P. LeRoux
(74) Attorney, Agent, or Firm—Needle & Rosenberg, P.C.

(57) ABSTRACT

An actual real-time reactive power output reserve of a generator is calculated by determining a real-time reactive power output of the generator at present operating conditions, determining a maximum reactive power output of the generator at the present operating conditions based on a maximum volt-ampere output capability of the generator, a real-time transmission voltage level of a transmission system connected to the generator, and a real-time maximum acceptable generator terminal voltage, and subtracting the real-time reactive power output from the maximum reactive power output. A future near-term reactive power output reserve of the generator is calculated by determining an expected maximum reactive power output of the generator at rated operating conditions based on a rated maximum volt-ampere output capability of the generator, a scheduled transmission voltage level of a transmission system connected to the generator, and a maximum acceptable generator terminal voltage, and subtracting the real-time reactive power output from the expected maximum reactive power output.

18 Claims, 10 Drawing Sheets

| UNIT NAME | SYSTEM VOLTS (kV) | SCHEDULED SYSTEM VOLTS (kV) | PRESENT GROSS MVAR | MVAR RESERVE |
|---|---|---|---|---|
| UNIT A1 | 522.35 | 522 | 169.03 | 59.15 |
| UNIT A2 | 522.35 | 522 | 176.84 | 27.38 |
| UNIT A3 | 522.35 | 522 | 138 | 357.3 |
| UNIT A4 | 522.35 | 522 | 116.07 | 182.95 |
| UNIT B1 | 237.96 | 238 | 28.09 | 7.4 |
| UNIT B2 | 237.96 | 238 | 41.65 | 10.5 |
| UNIT B3 | 237.96 | 238 | 108.23 | 24.8 |
| UNIT B4 | 237.96 | 238 | 70.63 | 31.1 |
| UNIT C1 | 117.91 | 117 | 21.3 | 4.08 |
| UNIT C2 | 117.54 | 117 | 23.39 | 18.93 |
| UNIT C3 | 118.49 | 117 | 36.76 | −22.16 |
| UNIT D1 | 237.64 | 238 | 125.67 | 148.43 |

FIG.6

METHOD, APPARATUS, AND SYSTEM FOR REAL TIME REACTIVE POWER OUTPUT MONITORING AND PREDICTING

BACKGROUND OF THE INVENTION

The present invention is directed to a method, apparatus, and system for monitoring and predicting reactive power output. More particularly, the present invention is directed to a method, apparatus, and system for monitoring present reactive power output in real time and predicting near-term future reactive power output.

Electric power is generated and transmitted through complex regional networks in order to provide electricity to consumers in an efficient and reliable manner. These networks contain hundreds and often thousands of generating sources that supply power to millions of users via one or more transmission systems.

Devices using electricity require a voltage level that is regulated within a certain range. Most of these devices are inductive loads and consume reactive power. Due to the dynamic load size and the need for a regulated transmission system voltage level, power systems must be designed to account for continuously changing demand for reactive power, among many other concerns.

Reactive power generated by power plants is commonly expressed in Volt-Ampere-Reactive (VAR) units. The amount and direction of VAR flow in the transmission system in part determines the voltage profile on the transmission system. Voltage levels may be increased by producing additional VARs at the generating units. Similarly, voltage levels may be decreased by absorbing VARs into the generating units. For regulating transmission voltage levels, it is necessary to understand the phenomena that control and limit the VAR flow between a generator and the transmission system.

Generating units (power plants) include several major parts that may each place limits upon the VAR flow related to the unit. An exemplary power plant is shown in FIG. 1. The power plant includes an alternating current generator 100 that enables the generating unit to either produce or absorb reactive power. The operation of a generating unit requires electricity to support miscellaneous plant equipment, including motors, in the station auxiliary system 110. Often, this electricity is provided by connecting a series of power transformers to the output leads of the generator. For example, as shown in FIG. 1, the station auxiliary system 110 includes station service transformers connected to the output of the generator 100. The internal plant equipment, e.g., the motors, supplied by these transformers must be operated within a certain acceptable voltage range. Maintaining this range may result in a restricted operating voltage range at the generator output terminals. The generating unit must also be connected to a transmission system 130, represented in FIG. 1 as a transmission line, in order to transmit electricity to consumers.

The output terminals of the generator 100 are typically connected to the high-voltage transmission system 130 through a step-up transformer 120. Operating conditions of the generator 100, station auxiliary system 110, and transmission system 130 change continuously and play a significant role in determining the VAR capability of a generating unit.

The generator is the central component of the unit and provides a means by which mechanical energy is converted into electrical energy. The generator includes two primary parts: the rotor and the stator. The rotor includes coils of electrical conductors that form a rotor winding. The stator also contains coils of electrical conductors. The generator output terminals are connected to the stator windings. Mechanical energy turns the rotor inside the stator while a current is passed through the rotor winding, inducing a voltage on the stator winding. By controlling the amount of mechanical energy used in turning the rotor, the real power flow in watts from the stator is adjusted. The rotor winding current, also known as the field current, is used to control the reactive power flow in VARs from the stator. Real or reactive power flows can be increased in the stator by boosting mechanical energy to the rotor or by boosting the field current, respectively. These power flows are often limited by the design parameters of the generator. For example, the generator output, stator and field current limits are due to heating effects associated with increased current.

To counteract these heating effects, hydrogen gas is used in most large generators as a cooling medium. Increasing the gas pressure, and thus the flow, of the cooling medium may increase the stator and field current capability limits.

Generator manufacturers normally express the VAR capability limits of a generator unit in a machine specific capability curve, such as that shown in FIG. 2. FIG. 2 illustrates a typical capability curve as provided by the manufacturer of the generator. For hydrogen cooled machines, a family of capability curves at various hydrogen pressures up to rated pressure may be provided. As shown in FIG. 2, the capability curve shows the leading and lagging MegaVARS (MVARS) for given Megawatts (MWATTS). Plant operators use these types of curves to monitor the output MVARS and MWATTS to ensure that they stay within the capability limits, thereby preventing harm to the plant, while the MVARS output is adjusted to maintain the transmission voltage schedule.

Many devices and software programs have been built to display the capability curve at the rated hydrogen pressure and the present operating point. However, the use of such devices to determine an available VAR reserve is unacceptable, since the true capability may be somewhat less than the rated capability, due to real-time hydrogen pressure, the transmission system voltage level or station service system limitations.

Generating unit operators often operate hydrogen cooled machines at pressures below the rated design conditions to eliminate unnecessary gas leakage. Observing signals from temperature measurement devices within the generator allows the operator to regulate hydrogen pressure to an optimal level. Depending on how far below the rated hydrogen pressure the generating unit is operated, there may be significant sacrifice of reserve VAR capability. This reserve VAR capability may be needed to regulate generator terminal voltage in the event of transmission system changes, such as large load additions, large load trips, transmission line trips or reclosures. Therefore, real-time capability curves at the present hydrogen pressure are needed to estimate the VAR reserve.

Boosting field current to produce VARs generally results in raising the generator terminal voltage magnitude. Decreasing field current to absorb VARs generally results in lowering the generator terminal voltage magnitude. Most generator designs allow a terminal voltage range between 95% and 105% of rated voltage. Therefore, the real time generator terminal voltage is needed to estimate the VAR reserve.

The station auxiliary system voltage must be regulated within a range specified by equipment manufacturer guidelines or established utility procedures. The minimum and maximum acceptable voltages of this system can have a direct impact on the allowable 95% to 105% generator terminal voltage operating range due to the interconnection of these two systems through a unit auxiliary transformer (UAT). Station auxiliary systems commonly restrict this range from its 10% bandwidth to a window of approximately 6–8% (unless load tap changers are used on the transformers). Since the station auxiliary system usually contains a series of transformers to achieve multiple voltage levels, the generator terminal voltage may be limited by equipment at any of these voltage levels. In many cases, equipment specifications on a low voltage bus (480 or 600 V) may restrict the generator operating range. Knowledge of this restriction may allow the plant engineer to design a solution by redistributing loads within the facility.

In order to minimize the limitations on the generator terminal voltage range, optimal transformer taps must be determined through a coordinated study of the entire station auxiliary system. Restriction of the generator voltage range is a function of transformer impedance, voltage ratio, tap selection, and real time loading on the transformer. Therefore, real time loading of the major station service transformers is needed to determine the VAR reserve.

The generator step-up transformer transformation ratio, including tap settings and present transmission system voltage, can have a major impact on the generator's VAR reserves. Tap settings are established during the initial generating unit start-up and are seldom changed unless significant system changes occur. Transmission system voltages change throughout each day and determine the present VAR flow of a unit given its system design and present operating conditions.

Thus, there is a need for a technique for determining a reactive power output in real time and predicting a future near-term reactive power output.

SUMMARY OF THE INVENTION

It is an object of the present invention to provide a technique for determining a reactive power output in real time and predicting a future near-term reactive power output.

This and other objects are met by a method, apparatus, and system for determining an actual real-time reactive power output reserve of at least one generator and predicting a future reactive power output reserve of the generator.

According to a first aspect of the invention, the actual real-time reactive power output reserve of the generator is calculated by determining a real-time reactive power output of the generator at present operating conditions, determining a maximum reactive power output of the generator at the present operating conditions, and subtracting the real-time reactive power output from the maximum reactive power output. The real-time reactive power output may be determined based on a maximum volt-ampere output capability of the generator at the present operating conditions, a real-time transmission voltage level of a transmission system connected to the generator, and a real-time maximum acceptable generator terminal voltage, including any real-time voltage limits associated with station service load buses connected to the generator.

According to another aspect of the invention, the near-term future reactive power output reserve of the generator is calculated by determining an expected maximum reactive power output of the generator at rated operating conditions and subtracting the real-time reactive power output from the expected maximum reactive power output. According to this embodiment, the real time reactive power output may be determined based on a rated maximum volt-ampere output capability of the generator at the rated operating conditions, a scheduled transmission voltage level of a transmission system connected to the generator, and a maximum acceptable generator terminal voltage, including any real-time voltage limits associated with station service load service buses connected to the generator.

According to exemplary embodiments, the determining of the reactive power output reserve may be repeated at regular near real-time intervals. Also, the reactive power output reserve may be determined for a plurality of generators.

Other information and benefits that may be gained from the invention will become more evident from the following description, especially when studying the figures and graphical displays.

BRIEF DESCRIPTION OF THE DRAWINGS

FIG. 6 illustrates an exemplary regional generating unit summary table as displayed according to exemplary embodiments;

DETAILED DESCRIPTION

According to exemplary embodiments, a method, apparatus, and system are provided for monitoring and predicting reactive power output. For this purpose, a series of curves and charts are generated and displayed, allowing users at various generating units and transmission system control centers to estimate the present and near real-time VAR reserves from generating units across a regional transmission system. The system may be adapted for use in any power system in any geographical area.

Figure 1:
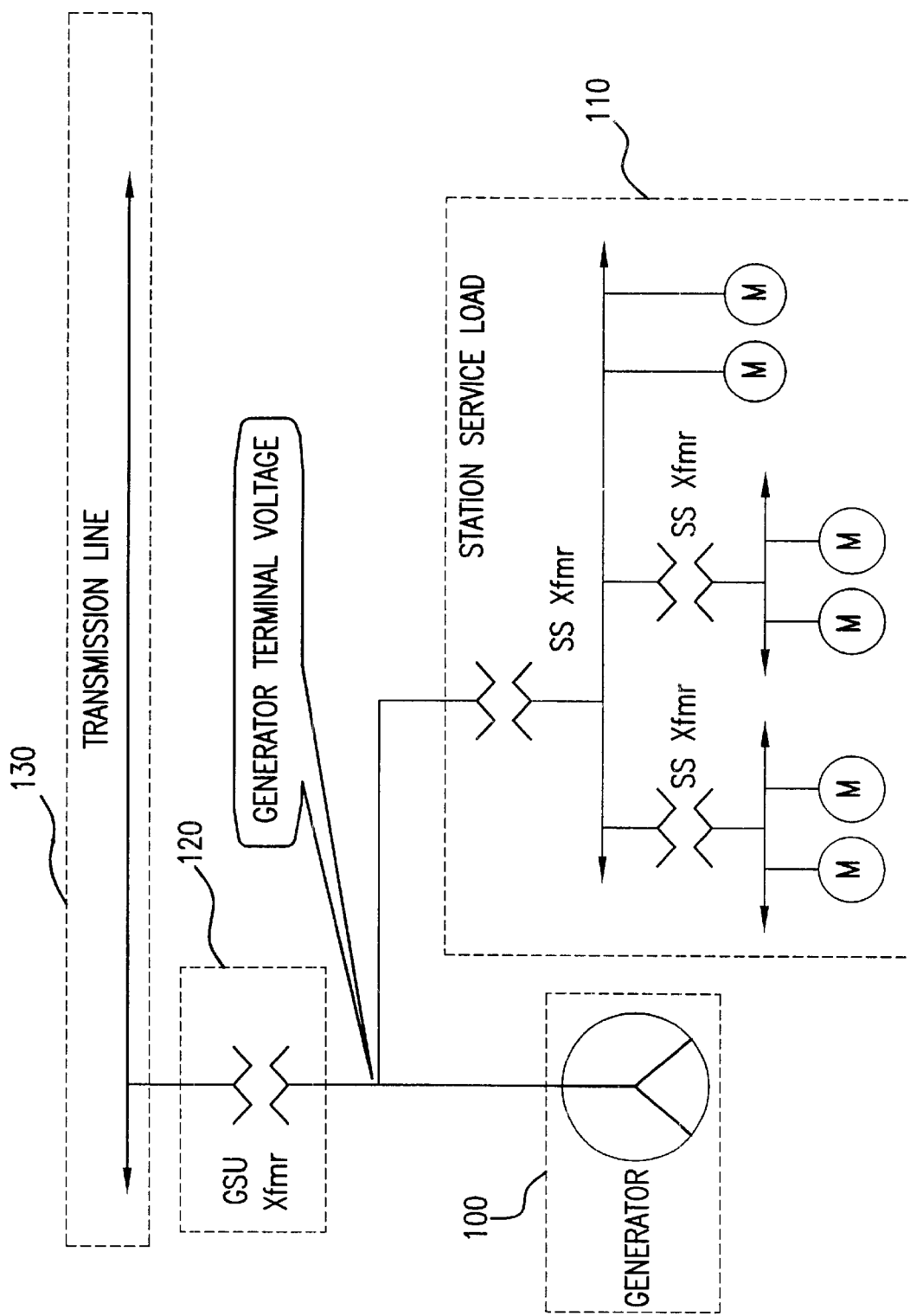
FIG. 1 illustrates a typical utility generating unit electrical system design with station service load fed from the generator's terminal.
Figure 2:
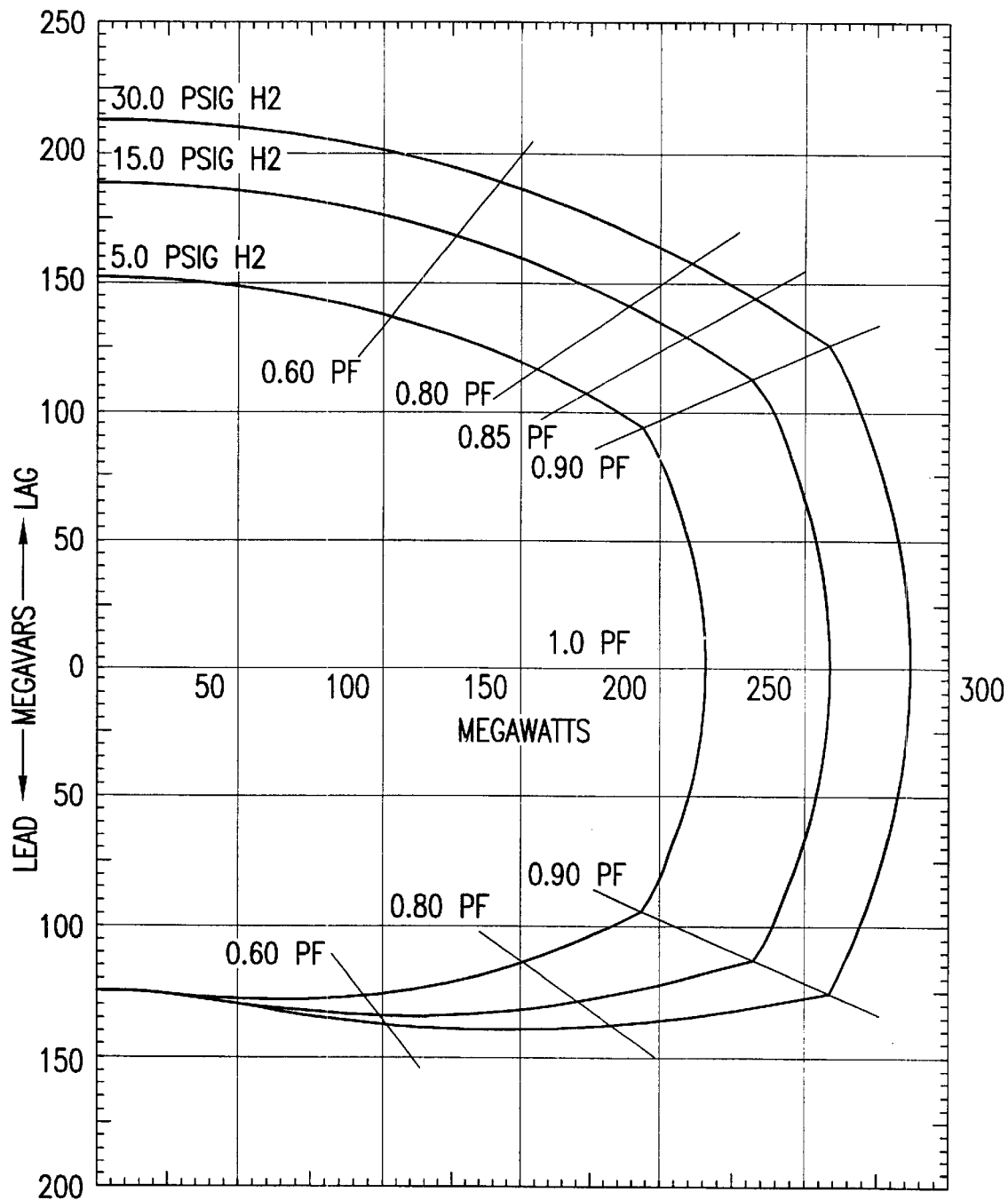
FIG. 2 illustrates a typical generator manufacturer's capability curve that is provided upon purchase of a generator.
Figure 3:
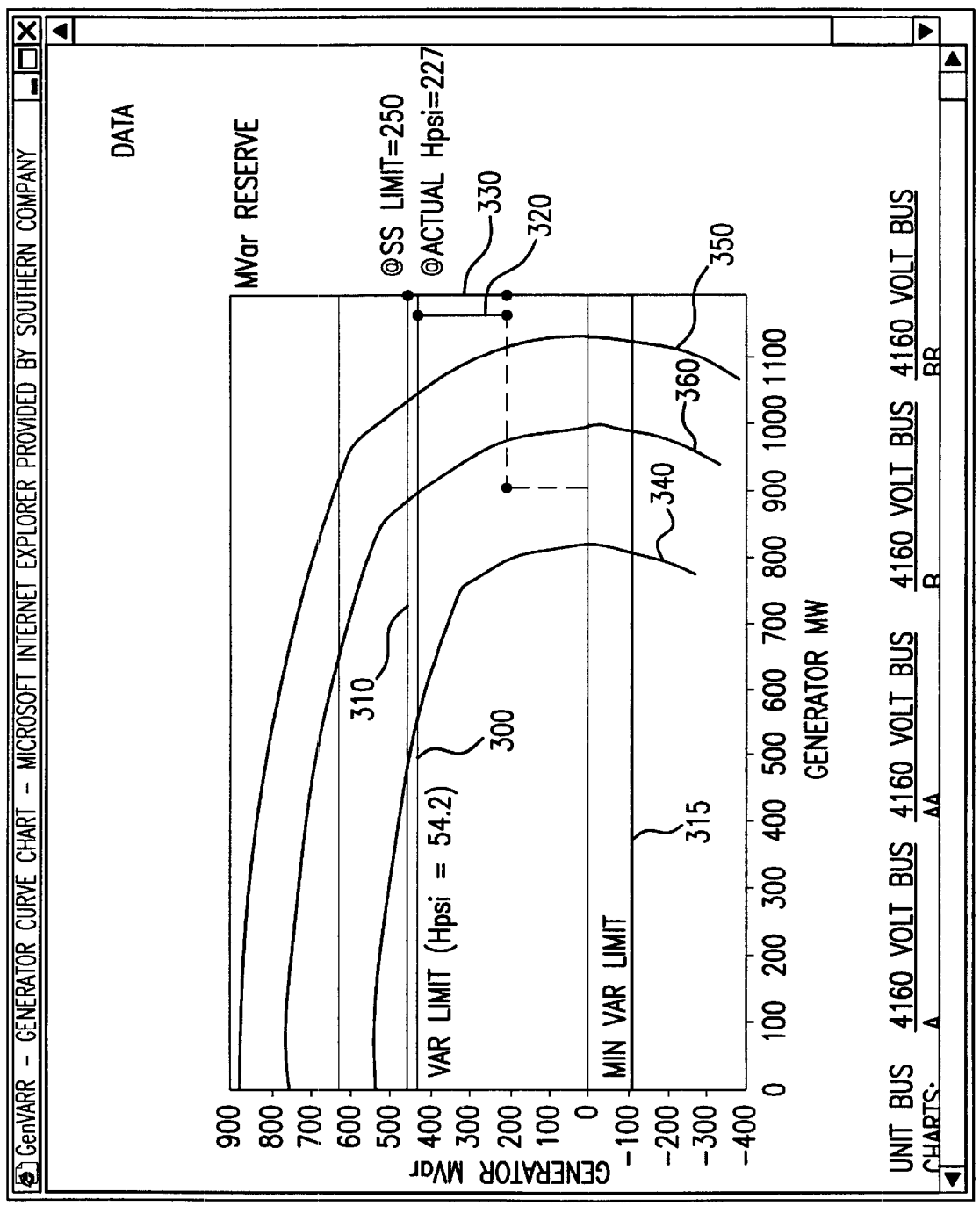
FIG. 3 illustrates a exemplary generator capability curve as displayed according to exemplary embodiments.

FIG. 3 illustrates acceptable voltage characteristics of a typical medium voltage auxiliary bus at various loading levels. The bus represented may be that connecting the generator 100 to a station service transformer in the station auxiliary system 110 shown in FIG. 1 or any of the buses connecting the station service transformers to each other in the station auxiliary system 110 or the buses connecting the station service transformers and the motors in the station auxiliary system 110. The two upper horizontal lines 300 and 310 in FIG. 3 represent the minimum acceptable station service bus voltage level and the maximum acceptable station service bus voltage level, respectively, in percent of the rated bus voltage. The acceptable voltage levels are determined from the rated bus voltage and manufacturer specifications for the equipment connected to this bus and downstream buses. The minimum VAR output of the generator is also shown in FIG. 3 as the horizontal line 315. The two vertical lines 320 and 330 in FIG. 3 denote the lowest loading on a particular bus and the highest loading on a particular bus, respectively, over a specified period of time, such as the previous two hours. The limiting operating point of the plant is indicated by the dashed lines. The recommended voltage range for the equipment on these buses may further restrict the generator terminal voltage within its normal 95–105% range. The electrical connection between the generator terminals and the medium voltage bus is the cause of this possible restriction.

According to exemplary embodiments, a display of the capability curves 340, 350, and 360 at the minimum expected, maximum expected and present hydrogen pressure levels, respectively, is shown in FIG. 3. The maximum expected capability curve 350 in FIG. 3 is usually identical to a capability curve such as that shown in FIG. 1 that is based upon rated generator hydrogen pressure. The present, near real-time capability curve 360 offers a distinct advantage over using just the normal capability curve by allowing a unit or system operator to know the present capability of the generating unit considering any reduction in hydrogen pressure. The lower segment of the capability curve is excluded from FIG. 3, since it is related to absorption, which is not the focus of this description.

Figure 4:
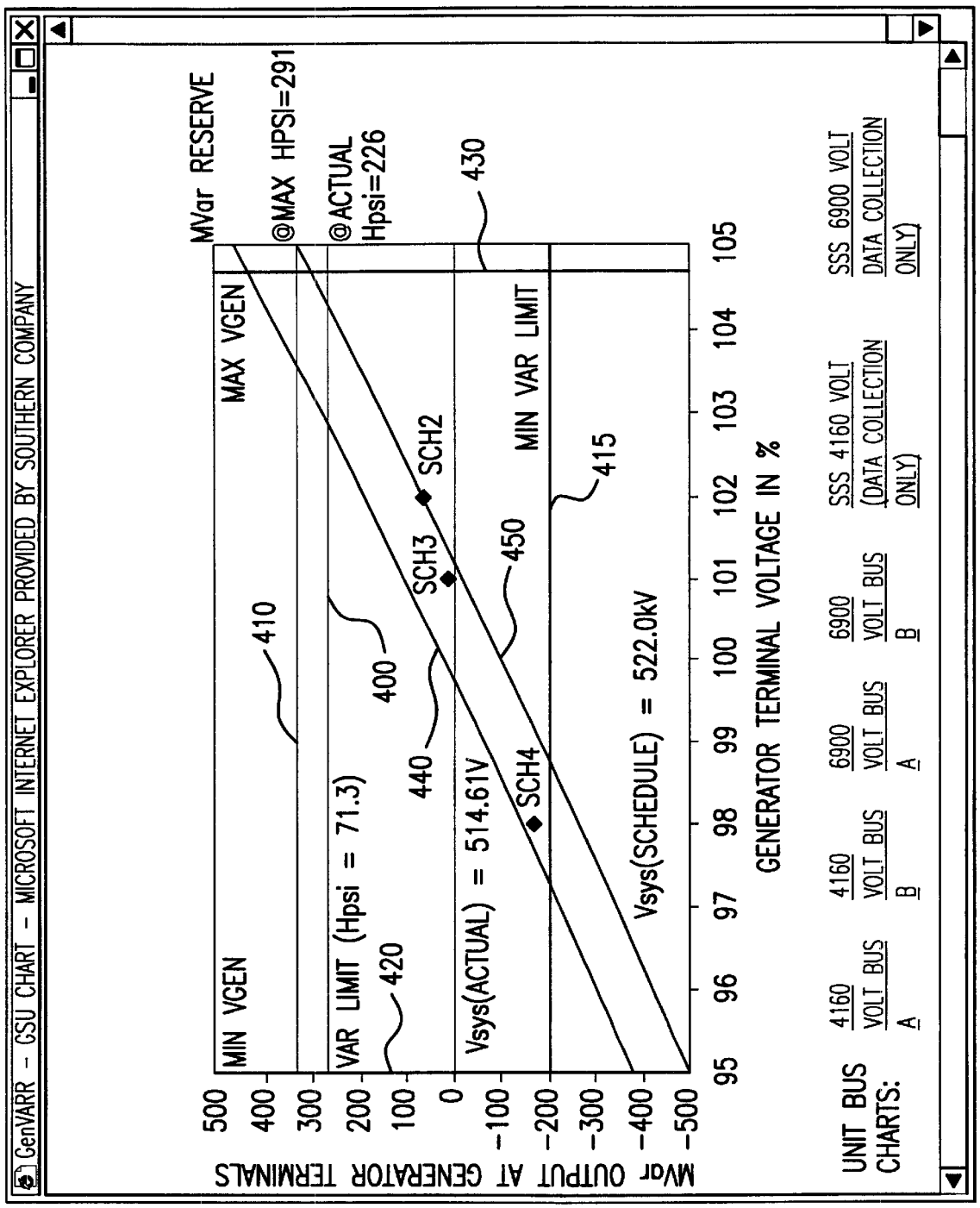
FIG. 4 illustrates an exemplary chart showing the interface between the generating unit and the transmission system, as displayed according to exemplary embodiments.

FIG. 4 shows a chart graphically illustrating the interface between the generating unit and the transmission system. The two vertical lines 420 and 430 shown in FIG. 4 depict the minimum acceptable generator terminal voltage limit and the maximum acceptable generator terminal voltage limit, respectively. Each of the two sloped lines 440 and 450 depicts the relationship between the generator terminal voltage and the VAR output of the generating unit for a given transmission system voltage. The slope of these two lines relates to the transformer impedance and is established upon purchase of the generator step-up transformer. The vertical location of these sloped lines is a function of the transformation ratio between the generator and the transmission system. The step-up transformers are usually purchased with a selection of taps that provide plant owners with the ability to optimize the generating units interface with the transmission system. In most cases, these tap positions can only be changed with the transformer de-energized.

The two sloping lines 440 and 450 are drawn to inform the user of available VAR flow both under present conditions as well as expected, or scheduled, transmission bus voltage conditions, respectively. In theory, the scheduled and actual transmission voltages should be identical; however, these two values may be different because the schedule values are based on system studies that make assumptions about transmission line, generating unit and load status.

The horizontal lines 400 and 410 represent the MVAR output for obtaining the minimum acceptable station service bus voltage level and the maximum acceptable station service bus voltage level, respectively. The horizontal line 415 represents the minimum MVAR output of the generator.

In addition to the transmission voltage magnitude, the transmission studies also predict the MVAR output of each generating unit required to support the scheduled transmission voltage. Scheduled VAR operating points may also be shown on this graph to determine whether a unit is operating as expected during, for example, a particular time of day.

FIGS. 3 and 4 each display results of calculations that are dependent on each other. Therefore, these calculations are best processed in a parallel fashion.

According to exemplary embodiments, the maximum VAR production level is determined under both the present and maximum expected hydrogen pressure capability curves by considering the present real power load of the generating unit. According to exemplary embodiments, it is assumed that the real power load will remain constant, thus allowing for the estimation of the maximum VAR production level permissible under each of the capability curves. The present VAR loading of the unit is subtracted from each of the two maximum production limits, and the resultant VAR reserves are displayed, for example, to the right of the graphs in FIGS. 3 and 4. For example, in FIG. 3, the MVAR reserve is indicated to be 250 at the station service limit and 227 at the actual hydrogen pressure. In FIG. 4, the MVAR reserve is indicated to be 291 at the maximum hydrogen pressure and 226 at the actual hydrogen pressure. The VAR reserves displayed in FIGS. 3 and 4 are substantially the same, and the previous description regarding this component of FIG. 3 applies likewise to FIG. 4.

In some cases, these generator VAR capabilities may be restricted by generator terminal voltage restrictions as previously described. In those cases, additional horizontal VAR limit lines appear on FIGS. 3 and 4, e.g., as shaded versions of the original limit lines (not shown). According to exemplary embodiments, these are the "achievable" generator VAR capabilities.

At the bottom of FIGS. 3 and 4, links to bus charts are shown. An example of such a bus chart is illustrated in detail in FIG. 5.

Figure 5:
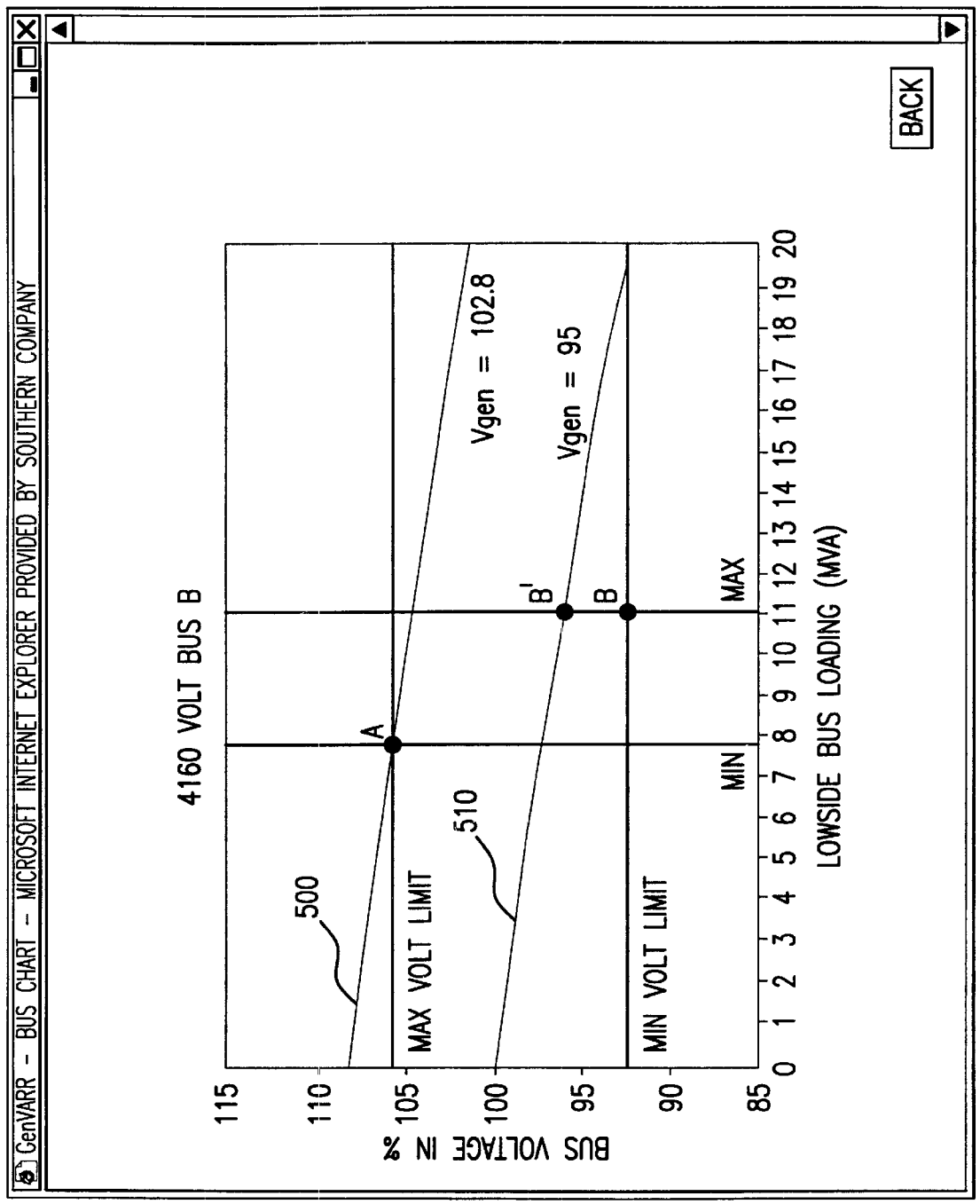
FIG. 5 illustrates an exemplary station auxiliary bus chart as displayed according to exemplary embodiments.

The exemplary bus chart shown in FIG. 5 illustrates the relationship between bus loading and bus voltage for different generator voltage levels. The two sloped lines 500 and 510 in FIG. 5 describe the correlation between a given generator terminal voltage and the medium bus voltage for a particular bus. Each of the sloped lines 500 and 510 represents the expected station service bus voltage for various loading points given a particular generator output voltage level. The slope of the lines, related to the transformer impedance, is established upon the purchase of a transformer.

According to exemplary embodiments, the minimum and maximum acceptable generator voltage levels that can safely supply the medium voltage bus are determined. As shown in FIG. 5, the two bounding conditions are minimum station service load at maximum generator terminal voltage, represented as point A, and maximum station service load at minimum generator terminal voltage, represented as point B. The design generator voltage levels and the results from similar calculations on other medium voltage buses supplied by this generator also bound the acceptable levels. Thus, given the generator terminal voltage limit Vgen=95%, the actual bounding condition at the maximum station service load and the minimum generator terminal voltage is represented as point Point B'. Though the downstream low voltage buses are not displayed graphically, their voltage supply needs and present operating conditions are properly accounted for at the medium voltage level. Once the acceptable generator terminal voltage is determined by considering station auxiliary limits and generator design limits, these limits are shown on a display representing a higher level view of the generating unit.

Progressing through calculations, the maximum VAR production of the generating unit is determined at both the present and maximum expected hydrogen pressures. Several factors are considered when making this determination. First, the capability of the generator given its present operating conditions is analyzed at both pressure levels as explained later. These two generator VAR limits are shown as horizontal limit lines on FIGS. 3 and 4 (lines 300 and 310 and lines 400 and 410, respectively). Next, the maximum VAR production of this unit is determined, based on present transmission system voltage levels. The maximum acceptable generator terminal voltage is used in conjunction with the mathematical relationship depicted in the actual transmission system voltage sloped line to determine the maximum VAR production. It is assumed that this level of VAR production can be achieved unless either the generator capability or the manually input VAR override parameters dictate otherwise. The present reactive power flow is subtracted from the present hydrogen pressure VAR limit to establish the present VAR reserve. The present reactive power flow is also subtracted from the maximum hydrogen pressure VAR limit to establish the near-term VAR reserve. The two VAR reserves are each shown on the right-hand side of FIG. 5, along with a note that indicates the causal factor of this constraint. The VAR absorption limit may also be displayed, although this limit is not a component of any calculations. As previously stated, the generator capability may limit the unit operation, either due to design constraints or present operating conditions.

Stepping to a higher level perspective, FIG. 6 illustrates an example of a screen that displays a summary of present VAR production and near-term future VAR reserves for a large number of generating units. The transmission planning engineers and system operators may utilize this regional perspective of available VAR production capacity to determine whether enough reactive capacity exists under some contingency condition. The regional or system-wide VAR reserve estimates may also be utilized in automated reliability and load flow software packages to enhance overall system reliability.

Figure 7:
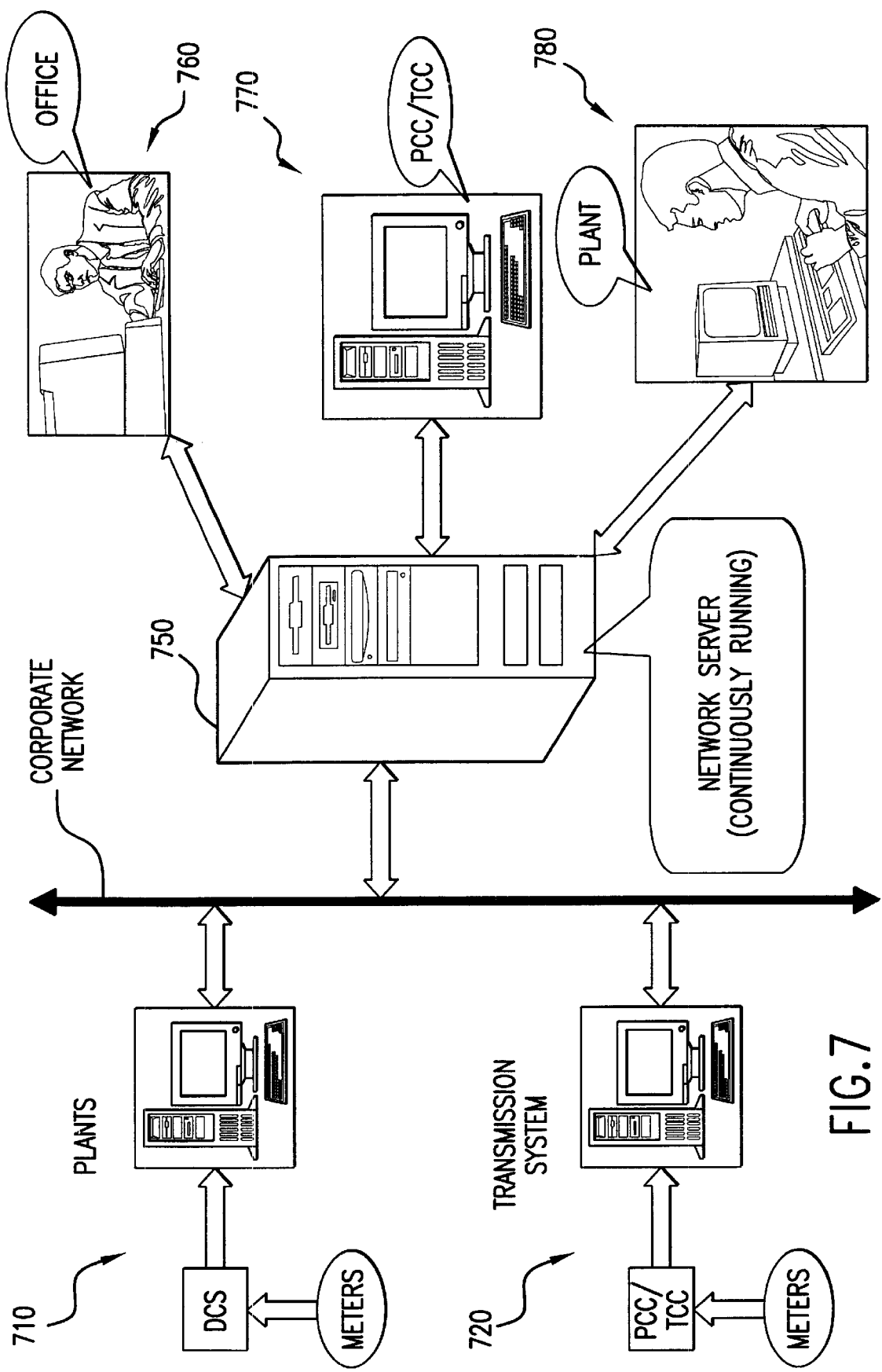
FIG. 7 illustrates an exemplary system for monitoring power output in real time according to the present invention.

FIG. 7 illustrates a system for monitoring and predicting power output according to exemplary embodiments. A network server 750 is connected via, e.g., a corporate network, to plants 710 and transmission systems 720. The network server 750 is also connected to an office 760, a Power Control Coordinator/Transmission Control Center (PCC/TCC) 770, and a plant 780. The plants 710 include meters for measuring power output, a Digital or Distributed Control System (DCS) and a personal computer. The transmission system includes meters for measuring power output, a PCC/TCC, and a personal computer. Measurements from the plants 710 and the transmission system 720 are transmitted to the network server 750. The network server 750, which is continually running, performs the calculations described above for estimating the present and expected VAR reserves. The network server 750 delivers these estimates to, e.g., an office 760, a PCC/TCC in a transmission system 770, and a plant 780. Operators in the office 760, the transmission system 770, and the plant 780 may view the results via a display.

Figure 8:
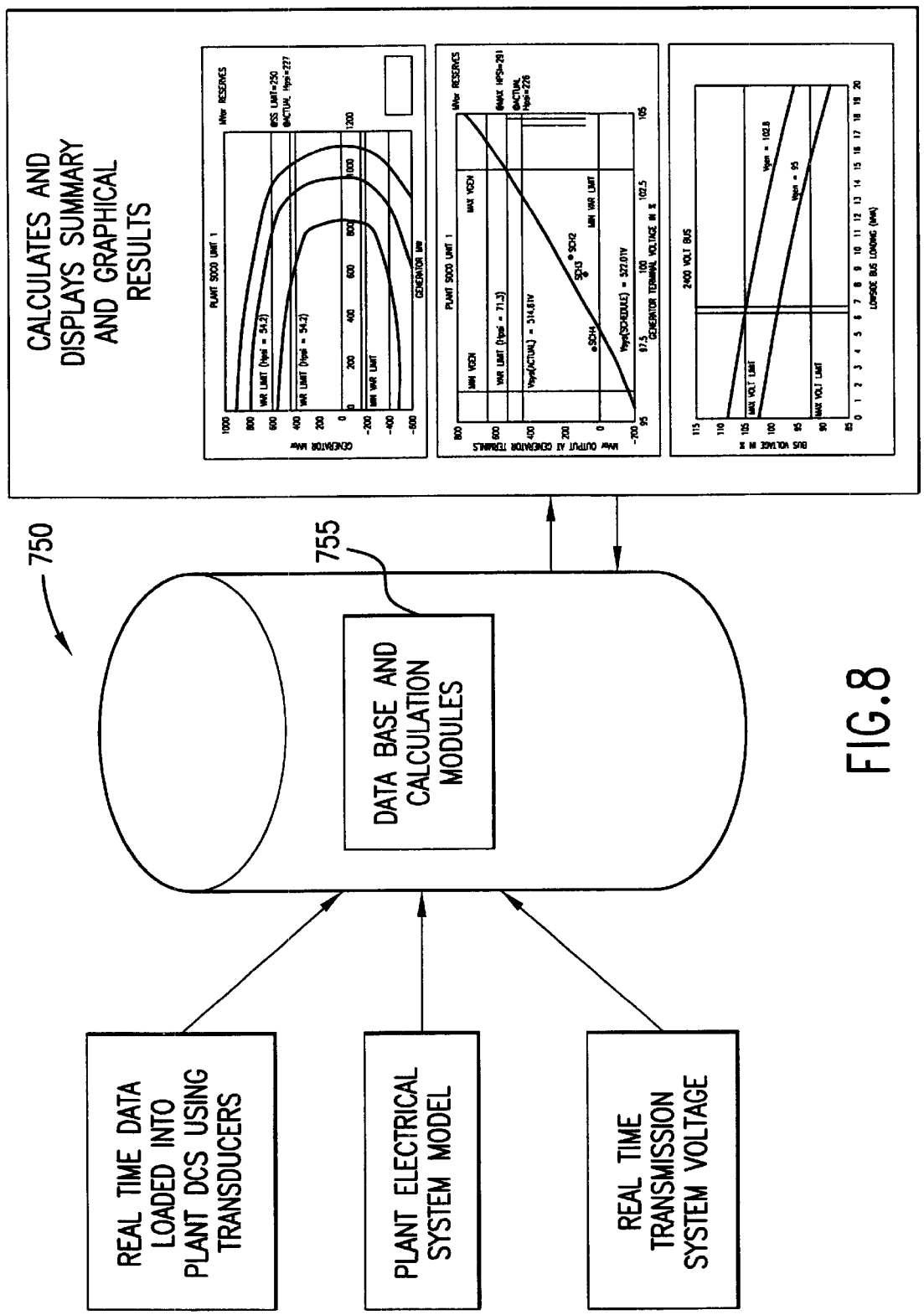
FIG 8 illustrates exemplary details of a network server according to the present invention.

FIG. 8 illustrates exemplary details of the network server 750. The network server 750 includes a database and a processor included in modules 755. Near real time data is loaded into the plant DCS using transducers, and the plant electrical system model and the near real time transmission system voltage are also loaded into the database. All the plant data is transmitted to and stored in the database. The plant updates the data at regular intervals, e.g., every minute. The processor calculates and displays summary and graphical results.

Figure 9A:
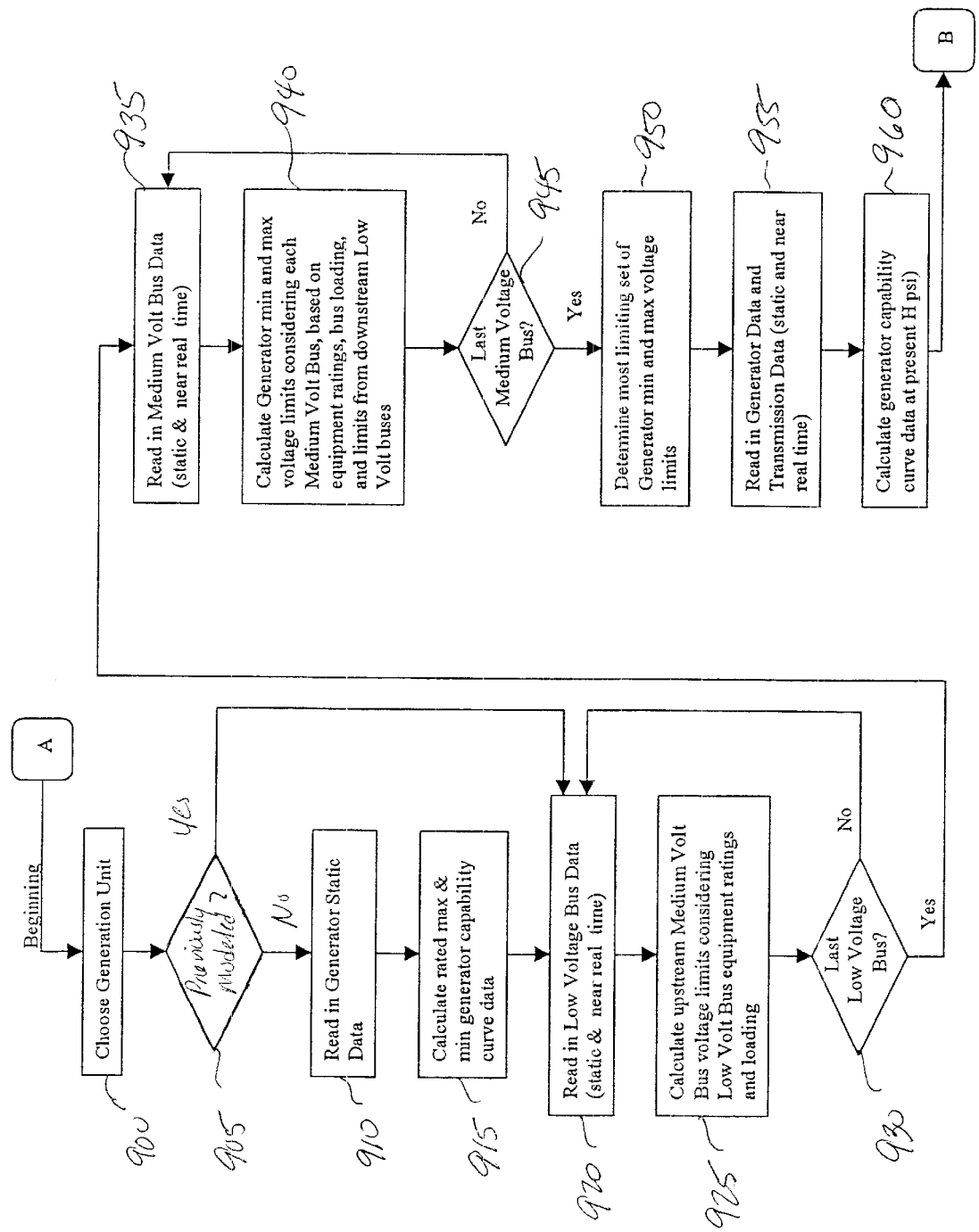
FIGS. 9A and 9B illustrate a method for monitoring power output in real time according to the present invention.
Figure 9B:
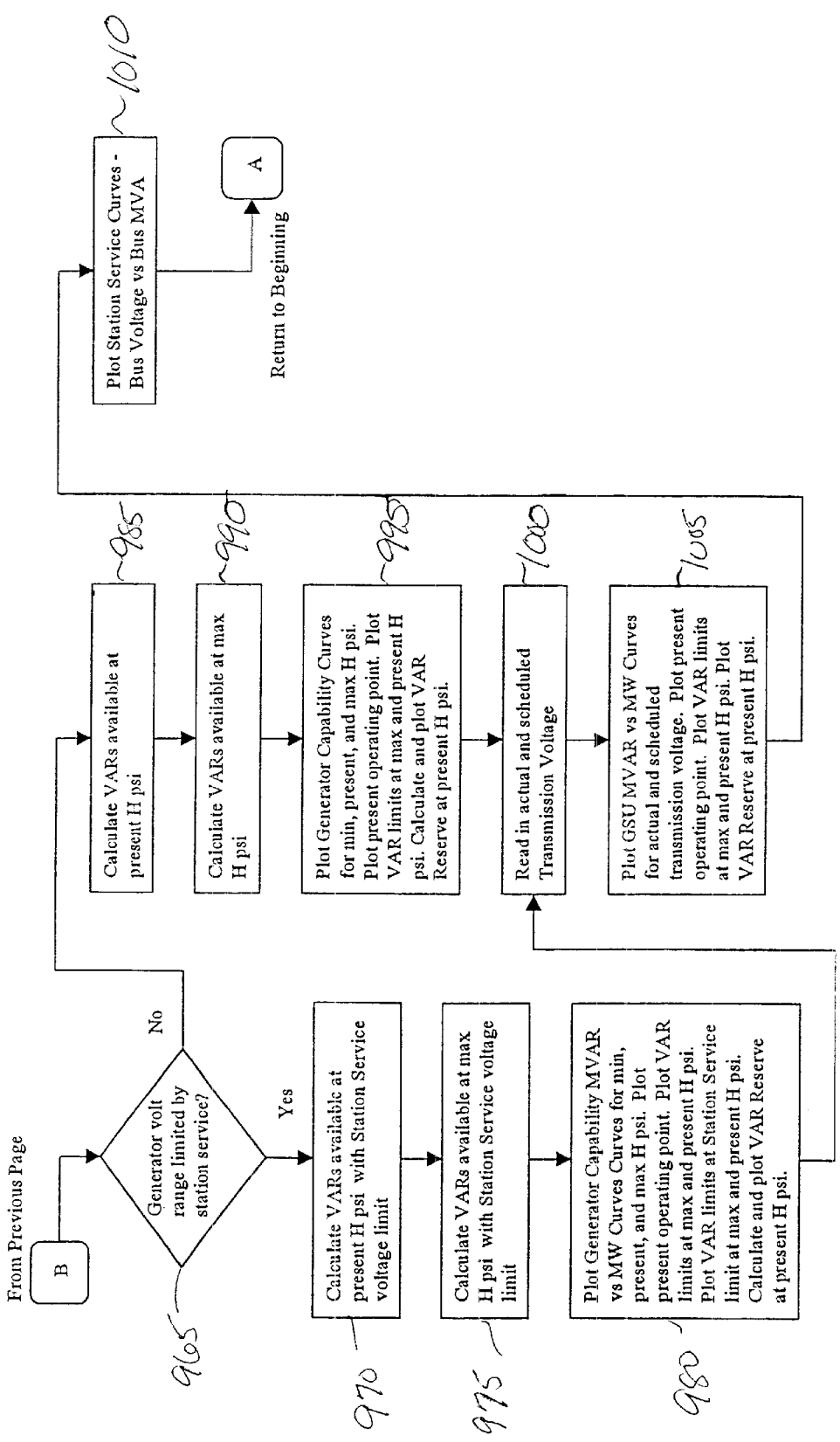

FIGS. 9A and 9B illustrate a method for monitoring power output according to exemplary embodiments. The method begins at step 900 at which a generator unit is chosen for monitoring. At step 905, a determination is made whether the generator unit has been previously modeled. If not, the generator static data is read at step 910, the rated maximum and minimum generator capability curve data is calculated at step 915, and the low voltage bus data is read for static and near real time at step 920. From step 920 for previously unmodeled generator units or from step 905 for previously modeled generator units, the upstream medium voltage bus voltage limits are calculated, considering low voltage bus equipment rating and loading at step 925. At step 930, a determination is made whether the last low voltage bus has been reached. If not, the low voltage bus data is read in again at step 920, and steps 925 and 930 are repeated. Otherwise, the medium voltage bus data is read in at step 935, for static and near real time.

At step 940, the generator minimum and maximum voltage limits are calculated, considering each medium voltage bus, based on equipment rating, bus loading, and limits from the downstream low voltage buses. At step 945, a determination is made whether the last medium voltage bus has been reached. If not, steps 935, 940 and 945 are repeated. Otherwise, the most limiting set of generator minimum and maximum voltage limits is determined at step 950, and the generator data and transmission data are read in for static and near real time at step 955. At step 960, the generator capability curve data is calculated at the present hydrogen pressure.

Following step 960, as shown in FIG. 9B, a determination made whether the generator voltage range is limited by the station service voltage limit at step 965. If so, the VARs available at the present hydrogen pressure with the station service voltage limit is calculated at step 970, the VARs available at maximum hydrogen pressure is calculated with the station service voltage limit at step 975, and the generator capability MVARS vs. MWATTS curves are plotted for minimum, present and maximum hydrogen pressures at step 980. The operating point, the VAR limits at the maximum and present hydrogen pressures, and the VAR limits at the station service limit at maximum and present hydrogen pressures are also plotted at step 980. In addition, the VAR reserve and the present hydrogen pressure are calculated and plotted.

If, at step 965, it is determined that the generator voltage range is not limited by the station service voltage limit, the VARs available at the present hydrogen pressure are calculated at step 985, the VARs available at the maximum hydrogen pressure are calculated at step 990, and the generator capability curves for minimum, present, and maximum hydrogen pressure and plotted at step 995. The present operating point and the VAR limits at the maximum and present hydrogen pressures are also plotted at step 995. In addition, the VAR reserve is calculated and plotted at the present hydrogen pressure at step 995.

From steps 980 and 995, the process proceeds to step 1000 at which the actual and scheduled transmissions voltages are read in. At step 1005, the GSU MVAR vs. MWATT curves are plotted for actual and schedule transmission voltages. The present operating point is also plotted, along with the VAR limits at the maximum and present hydrogen pressures. In addition, the VAR reserve is plotted at the present hydrogen pressure. At step 1010, the station service curves are plotted for the bus voltage vs. the bus loading. The process then returns to the beginning, step 900.

According to exemplary embodiments, the present VAR limit of a generating unit is determined considering present operating conditions and limitations of multiple components at the facility. In addition, the near term future VAR limit of the same generating unit is predicted considering the same limitations. Of course, the plant operator may be able to change certain operating parameters that presently limit the unit if allowed, for example, 30–45 minutes. Therefore, the near-term future VAR limit assumes that these limitations will be removed.

According to exemplary embodiments, the present operating conditions are obtained from multiple generating units and the present and near-term future VAR reserves are determined for each unit. In addition, transmission system operators can view results for multiple units at a central control station. Estimation of these parameters can provide transmission planning engineers with new information and enable further improvements in transmission system reliability.

Additional benefits may be derived from the storage of the information used in calculating VAR reserves for numerous plant sites on a transmission system. This information is continually monitored, calculated, and recorded in a common database. The information is viewable at any generating unit site or transmission control center through a computer network. The stored data is often very useful for tasks such as plant electrical system load studies, transformer tap optimization, and equipment upgrade planning.

It should be understood that the foregoing description and accompanying drawings are by example only. A variety of modifications are envisioned that do not depart from the scope and spirit of the invention. The above description is intended by way of example only and is not intended to limit the present invention in any way.

What is claimed is:

1. A method for determining an actual real-time reactive power output reserve of at least one generator, comprising the steps of:
   determining a real-time reactive power output of the generator at a present gas cooling gas pressure;
   determining a maximum reactive power output capability of the generator at the present cooling gas pressure; and
   determining the real-time reactive power output reserve of the generator by subtracting the real-time reactive power output from the maximum reactive power output capability.

2. The method of claim 1, wherein the real-time reactive power output is determined based on a maximum volt-ampere output capability of the generator at the present cooling gas pressure, a real-time transmission voltage level of a transmission system connected to the generator, and a real-time maximum acceptable generator terminal voltage, including real-time voltage limits associated with station service load buses connected to the generator.

3. The method of claim 1, further comprising predicting a future reactive power output reserve of the generator.

4. The method of claim 3, wherein the step of predicting the future reactive power output reserve comprises:
   determining an expected maximum reactive power output capability of the generator at rated cooling gas pressure; and
   subtracting the real-time reactive power output from the expected maximum reactive power output capability to obtain the future reactive power output reserve.

5. The method of claim 1, wherein the steps for determining the reactive power output reserve are repeated at regular intervals.

6. The method of claim 1, wherein the steps are performed for a plurality of generators.

7. An apparatus for determining an actual real-time reactive power output reserve of at least one generator, comprising:
   means for determining a real-time reactive power output of the generator at a present cooling gas pressure conditions;
   means for determining a maximum reactive power output capability of the generator at the present cooling gas pressure; and
   means for determining the real-time reactive power output reserve by subtracting the real-time reactive power output from the maximum reactive power output capability.

8. The apparatus of claim 7, wherein the real-time reactive power output capability is determined based on a maximum volt-ampere output capability of the generator at the present cooling gas pressure, a real-time transmission voltage level of a transmission system connected to the generator, and a real-time maximum acceptable generator terminal voltage, including real-time voltage limits associated with station service load buses connected to the generator.

9. The apparatus of claim 7, further comprising means for predicting a future reactive power output reserve.

10. The apparatus of claim 9, wherein the means for predicting the future reactive power output reserve comprises:
    means for determining an expected maximum reactive power output capability of the generator at rated cooling gas pressure; and
    means for subtracting the real-time reactive power output from the expected maximum reactive power output capability to obtain the future reactive power output reserve.

11. The apparatus of claim 7, wherein the determination of the reactive power output, maximum reactive power output capability, and reactive power output reserve is repeated at regular intervals.

12. The apparatus of claim 7, wherein the reactive power output reserve is determined for a plurality of generators.

13. A system for determining an actual real-time reactive power output reserve; comprising:
    at least one generator;
    input means for receiving information from the generator in real time, including information regarding a present cooling gas pressure; and
    a processor connected to the input means, wherein the processor determines a real-time reactive power output of the generator at the present cooling gas pressure, determines a maximum reactive power output capability of the generator at the present cooling gas pressure, and determines the real-time reactive power output reserve by subtracting the real-time reactive power output from the maximum reactive power output capability.

14. The system of claim 13, wherein the input means also receives information from a transmission system connected to the generator, and the processor determines the real-time reactive power output capability based on a maximum volt-ampere output capability of the generator at the present cooling gas pressure, a real-time transmission voltage level of the transmission system connected to the generator, and a maximum acceptable generator terminal voltage, including real-time voltage limits associated with station service load buses connected to the generator.

15. The system of claim 13, wherein the processor predicts a future reactive power output reserve of the generator.

16. The system of claim 15, wherein for predicting the future reactive power output reserve, the processor determines an expected maximum reactive power output capability of the generator at rated cooling gas pressure and subtracts the real-time reactive power output from the expected maximum reactive power output capability to obtain the future reactive power output reserve.

17. The system of claim 13, wherein the processor repeats the determination of the real-time reactive power output, the maximum reactive power output capability, and the real-time reactive power output reserve at regular intervals.

18. The system of claim 13, wherein the reactive power output reserve is determined for a plurality of generators.

* * * * *